(12) United States Patent
Issel

(10) Patent No.: US 7,270,019 B2
(45) Date of Patent: Sep. 18, 2007

(54) COLLECTING LINE ASSEMBLY FOR MONITORING AND LOCATING LEAKS

(75) Inventor: Wolfgang Issel, Karlsruhe (DE)

(73) Assignee: Areva NP GmbH, Erlangen (DE)

( * ) Notice: Subject to any disclaimer, the term of this patent is extended or adjusted under 35 U.S.C. 154(b) by 0 days.

(21) Appl. No.: 11/701,717

(22) Filed: Feb. 2, 2007

(65) Prior Publication Data

US 2007/0157744 A1     Jul. 12, 2007

Related U.S. Application Data

(63) Continuation of application No. PCT/EP2006/004405, filed on May 11, 2006.

(30) Foreign Application Priority Data

May 20, 2005   (DE)  ................ 10 2005 023 255

(51) Int. Cl.
*G01M 3/02* (2006.01)
*G01N 1/26* (2006.01)

(52) U.S. Cl. ............... 73/863.23; 73/31.07; 73/863.33

(58) Field of Classification Search .... 73/31.02–31.03, 73/863.23, 31.07, 64.56, 40.7, 863.33
See application file for complete search history.

(56) References Cited

U.S. PATENT DOCUMENTS

| | | | | |
|---|---|---|---|---|
| 3,977,233 A | | 8/1976 | Issel | .............. 73/40.5 R |
| 4,169,059 A | * | 9/1979 | Storms | .............. 210/493.1 |
| 4,735,095 A | | 4/1988 | Issel | .............. 73/864.81 |
| 4,973,435 A | * | 11/1990 | Jain et al. | .............. 264/29.6 |
| 5,347,223 A | * | 9/1994 | Krcma et al. | .............. 324/455 |
| 5,635,652 A | * | 6/1997 | Beaudin | .............. 73/863.03 |
| 5,637,809 A | * | 6/1997 | Traina et al. | .............. 73/864.12 |
| 5,951,791 A | | 9/1999 | Bell et al. | .............. 148/518 |
| 6,096,212 A | * | 8/2000 | Quick et al. | .............. 210/493.2 |
| 6,180,909 B1 | * | 1/2001 | Quick et al. | .............. 219/85.13 |
| 6,291,806 B1 | * | 9/2001 | Quick et al. | .............. 219/633 |
| 2005/0005681 A1 | * | 1/2005 | Anderson | .............. 73/40 |
| 2007/0113686 A1 | * | 5/2007 | Desrochers et al. | .............. 73/863.33 |

FOREIGN PATENT DOCUMENTS

| | | |
|---|---|---|
| DE | 24 31 907 | 1/1976 |
| DE | 34 34 323 C2 | 3/1986 |
| DE | 41 25 739 A1 | 2/1993 |
| DE | 197 21 081 C1 | 7/1998 |
| EP | 0 175 219 B1 | 5/1988 |
| JP | 01184009 A * | 7/1989 |

\* cited by examiner

*Primary Examiner*—Thomas P. Noland
(74) *Attorney, Agent, or Firm*—Laurence A. Greenber; Werner H. Stemer; Ralph E. Locher

(57) ABSTRACT

An assembly for monitoring and locating leaks in an installation includes a collecting line formed of a material that is impermeable to a substance to be monitored. The collecting line has a multiplicity of openings spaced apart in its longitudinal direction. The openings are closed with a filter element of a sintered metallic material that is permeable to the substance and has been subjected to a heat treatment in an oxidizing atmosphere.

6 Claims, 1 Drawing Sheet

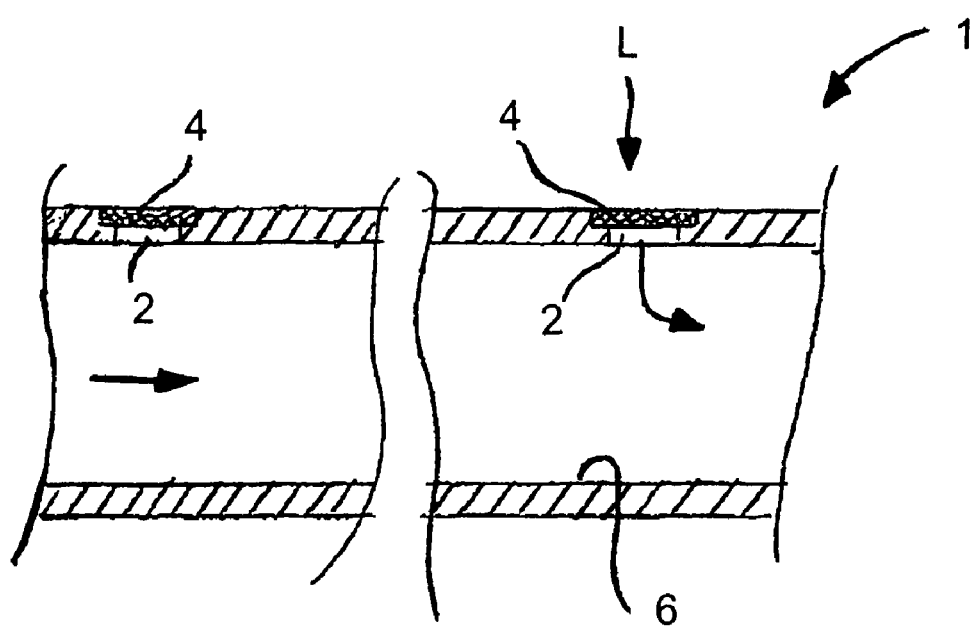

COLLECTING LINE ASSEMBLY FOR MONITORING AND LOCATING LEAKS

CROSS-REFERENCE TO RELATED APPLICATIONS

This is a continuing application, under 35 U.S.C. §120, of copending International Application No. PCT/EP2006/004405, filed May 11, 2006, which designated the United States; this application also claims the priority, under 35 U.S.C. §119, of German Patent Application DE 10 2005 023 255.8, filed May 20, 2005; the prior applications are herewith incorporated by reference in their entirety.

BACKGROUND OF THE INVENTION

Field of the Invention

The invention relates to a collecting line assembly for monitoring and locating leaks in an installation.

European Patent 0 175 219 B1, corresponding to U.S. Pat. No. 4,735,095, discloses a collecting line which includes a pipe that is impermeable to a substance to be detected, and which is provided in its longitudinal direction with a multiplicity of openings that are closed with a microporous sintered metallic material. A substance to be detected, in the example water or water vapor, escaping through the openings from a leak in part of the installation, for example the primary circuit of a pressurized water nuclear reactor, into the vicinity of the collecting line, can diffuse into the interior of the pipe. The location at which the substance has penetrated into the collecting line is then determined by a method known from German Patent DE 24 31 907, corresponding to U.S. Pat. No. 3,977,233. That location corresponds to the point at which the substance has escaped from the part of the installation that is being monitored. For that purpose, a pump connected to the collecting line is used to send the substance that has penetrated into the collecting line, together with a carrier gas located in the collecting line, to a sensor likewise connected to the collecting line. With a known flow rate, the location at which the substance penetrates into the collecting line, and consequently the location of the leak in the part of the installation, can be determined from the period of time between the switching-on of the pump and the arrival of the substance at the sensor. Sintered metals of pure metals, in particular high-grade steel and nickel (Ni), have been found to be particularly suitable sintered metallic materials for a large number of applications. Nickel is suitable in the case of pore diameters in a range of a few µm, in particular for the detection of water or water vapor. Those sintered metals are produced by sintering at temperatures just below the melting temperature in a reducing atmosphere, in particular in the presence of hydrogen, in order to ensure a good metallurgical bond between the pressed particles.

The microporous sintered metallic material closing the openings thereby has to perform two conflicting tasks. On the hand, it must have adequate porosity to permit rapid diffusion of the substance to be detected into the interior of the collecting line, that is to say to permit a short response time. On the other hand, however, it must also have an adequately high flow resistance to ensure that the carrier gas located in the collecting line and serving for transporting the substance, remains in the collecting line as far as possible during the pumping operation.

SUMMARY OF THE INVENTION

It is accordingly an object of the invention to provide a collecting line assembly for monitoring and locating leaks in an installation, which overcomes the hereinafore-mentioned disadvantages of the heretofore-known devices of this general type and which permits the detection of a substance to be carried out with great sensitivity and short response times.

With the foregoing and other objects in view there is provided, in accordance with the invention, an assembly for monitoring and locating leaks in an installation. The assembly comprises a collecting line formed of a material being impermeable to a substance to be monitored. The collecting line has a multiplicity of openings spaced apart in longitudinal direction. A microporous filter element closes the openings. The filter element is formed of a sintered metallic material. The sintered metallic material is permeable to the substance to be monitored and has been subjected to a heat treatment in an oxidizing atmosphere.

Such a heat treatment in an oxidizing atmosphere, i.e. in the presence of oxygen, has surprisingly shown that, with an unchanged pore width, the rate of diffusion for the substance, in particular water vapor or water, increases significantly, so that leaks possibly occurring can be detected and located at an earlier time. The cause of this is very probably the increased formation of an oxide film on the pore surface of the particle matrix of the sintered metal. This allows the water vapor diffusing in to be passed more quickly and in higher concentration into the interior of the tube than the thin oxide film of an untreated sintered metal.

In accordance with another feature of the invention, a particularly efficient improvement of the permeability of the filter element by a heat treatment in an oxidizing atmosphere is achieved if it is formed of nickel (Ni).

In accordance with an added feature of the invention, the heat treatment is preferably performed in an atmosphere containing oxygen, in a temperature range between 600° C. and 800° C. This temperature range lies at least 400° C. below the sintering temperature of the respective sintered metallic material.

In accordance with an additional feature of the invention, the heat treatment is carried out after the sintering.

In accordance with yet another feature of the invention, the collecting line is formed of steel and is electropolished on its inner surface. This measure is suitable for considerably reducing the adsorption of the transported substance at the oxide film of the inner surface of the collecting line, which in the unpolished state is very rough in the micro range and has a large surface area, by greatly reducing this surface area and thereby significantly improving the transporting properties of the substance that has diffused in. This makes it possible to accomplish longer line lengths with greater measuring sensitivity.

In accordance with a concomitant feature of the invention, as an alternative to electropolished steel, the collecting line may also be coated with a material which has a low adsorption and absorption capacity for the substance to be detected, for example a high-grade metal, in particular gold. In principle, however, nonmetallic coatings, for example of a ceramic or other chemical nature, that durably withstand an operating temperature of about 300° C., are also suitable. In these cases it is not necessary to use a collecting line made of steel.

Other features which are considered as characteristic for the invention of the instant application are set forth in the appended claims.

Although the invention is illustrated and described herein as embodied in a collecting line assembly for monitoring and locating leaks, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The figure of the drawing is a diagrammatic, longitudinal-sectional view of an exemplary embodiment of a collecting line assembly according to the invention.

DESCRIPTION OF THE PREFERRED EMBODIMENT

Referring now to the single figure of the drawing in detail, there is seen a collecting line 1 which is provided with a multiplicity of openings 2, that are spaced apart in longitudinal direction and are closed with a filter element 4 of a microporous sintered metallic material. The filter element 4 is permeable to a substance L that is to be monitored. With the exception of the filter element 4, the collecting line 1 is formed of a material, high-grade steel in the exemplary embodiment, that is impermeable to the substance L. Depending on the intended purpose, the collecting line 1 may be a flexible or rigid pipe with a circular cross section or other cross-sectional shape. The collecting line 1 may also be made up of a number of pipe sections, which are connected to one another through the use of intermediate pieces in which the filter elements 4 are inserted.

The collecting line 1 is mechanically, chemically or electrochemically treated on its inner surface 6, in order to reduce its adsorption and absorption capacity for the substance L entering in the case of a leak. As an alternative thereto, the inner surface 6 may also be provided with a layer of a high-grade metal, for example gold (Au), a ceramic, a mineral, in particular silicate-based, or another temperature-resistant material.

I claim:

1. An assembly for monitoring and locating leaks in an installation, the assembly comprising:

a collecting line formed of a material being impermeable to a substance to be monitored, said collecting line having a multiplicity of openings spaced apart in longitudinal direction; and a filter element closing said openings, said filter element formed of a sintered metallic material, said sintered metallic material being permeable to the substance to be monitored and having been subjected to a heat treatment in an oxidizing atmosphere.

2. The assembly according to claim 1, wherein said sintered metallic material is nickel.

3. The assembly according to claim 2, wherein said heat treatment is performed in an atmosphere containing oxygen, in a temperature range between 600° C. and 800° C.

4. The assembly according to claim 1, wherein said heat treatment has been carried out after the sintering.

5. The assembly according to claim 1, wherein said collecting line is formed of steel and has an electropolished inner surface.

6. The assembly according to claim 1, wherein said collecting line has an inner surface coated with a high-grade metal.

* * * * *